Aug. 1, 1967    C. B. ANDREASEN ETAL    3,333,584
PRESSURE BREATHING MONITOR
Filed June 18, 1964    3 Sheets-Sheet 1

INVENTORS
Christian B. Andreasen
Edward P. Romani
BY
ATTORNEYS

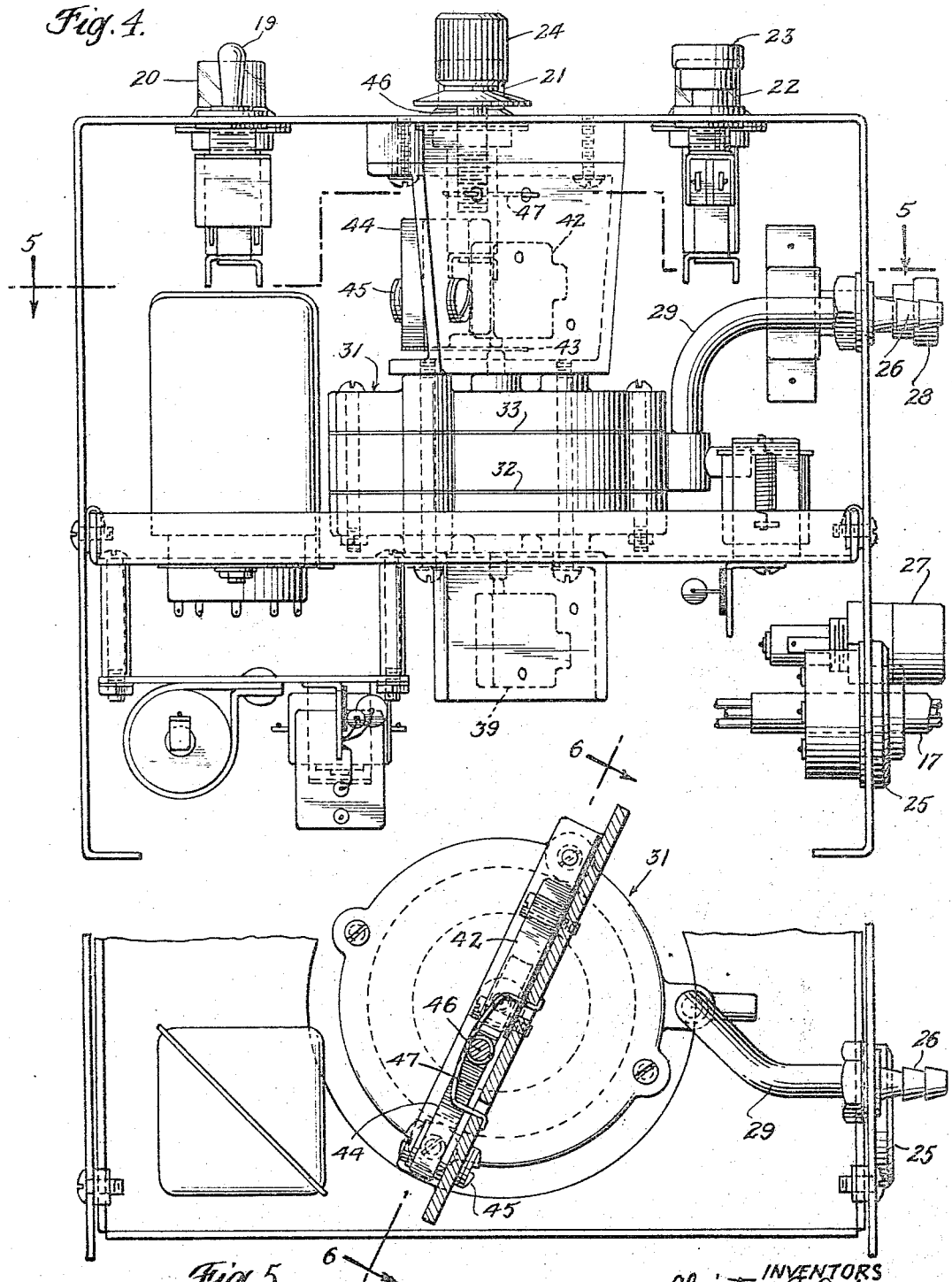

Aug. 1, 1967 C. B. ANDREASEN ETAL 3,333,584
PRESSURE BREATHING MONITOR
Filed June 18, 1964 3 Sheets-Sheet 3

INVENTOR.
Christian B. Andreasen
Edward P. Romani
BY
*[signature]*
ATTORNEYS

United States Patent Office 3,333,584
Patented Aug. 1, 1967

3,333,584
PRESSURE BREATHING MONITOR
Christian B. Andreasen, New Hope, and Edward P. Romani, Levittown, Pa., assignors to Air-Shields, Inc., Hatboro, Pa., a corporation of Delaware
Filed June 18, 1964, Ser. No. 376,129
2 Claims. (Cl. 128—145.5)

This invention relates to a pressure breathing monitor and is particularly concerned with a monitor adapted for use with breathing equipment for assisting or effecting a patient's breathing, either with or without the presence of an anesthetic gas.

One of the principal objects of the invention is to provide a monitor arranged to give a signal under certain conditions resulting either from a change in the condition of the patient, or from a malfunction of the breathing equipment or of associated anesthesia apparatus.

More specifically, the invention contemplates the provision of a monitor giving a warning signal upon the occurrence of any one of several undesirable events in the breathing cycle. Thus, the monitor according to the present invention gives a warning signal in the event that the pressure in the airway leading to the patient remains below a predetermined value for a predetermined interval of time, for instance an interval of about 11 seconds. The monitor is also arranged to give a signal in the event that the pressure in the airway leading to the patient exceeds a predetermined value for a predetermined interval of time, for instance an interval of about 4 seconds.

It is a further object of the invention to provide for manual resetting of the monitor at least with relation to the actuation or energization of the warning signal following the occurrence of a pressure drop below a predetermined value for the predetermined interval, such as the 11 second interval above referred to.

In accordance with another aspect of the invention the monitor is arranged to give a warning signal immediately upon the occurrence in the patient's airway of a pressure exceeding a certain predetermined pressure, which latter pressure is adjustable so that the monitor is readily adapted to patients in different conditions.

The monitor of the present invention is preferably also arranged so that the breathing apparatus can be powered from the monitor, and the monitor is arranged so that in the event of the failure of the power supply a warning signal is given.

In the preferred arrangement of the invention the warning signal for exceeding a predetermined time at a pressure below a predetermined value is also used as the warning signal for the occurrence of an excess of pressure above a predetermined value for an interval greater than a predetermined interval; and a different warning signal is actuated immediately in response to an increase in pressure in the patient's airway beyond the adjustable value above referred to.

For various of the purposes above referred to, both audible and visual signals are employed in parallel, so that doctors, nurses or other attendants using the equipment may be apprised of changes in the condition of the patient either "by ear" or by observing the visual signals.

How the foregoing objects and advantages are attained will be clear from the following description referring to the accompanying drawings in which:

FIGURE 4 is an elevational view of the monitor shown in FIGURES 2 and 3, with the cover removed so as to disclose certain parts lying within;

FIGURE 5 is a sectional view taken generally as indicated by the section line 5—5 on FIGURE 4;

Figure 1:
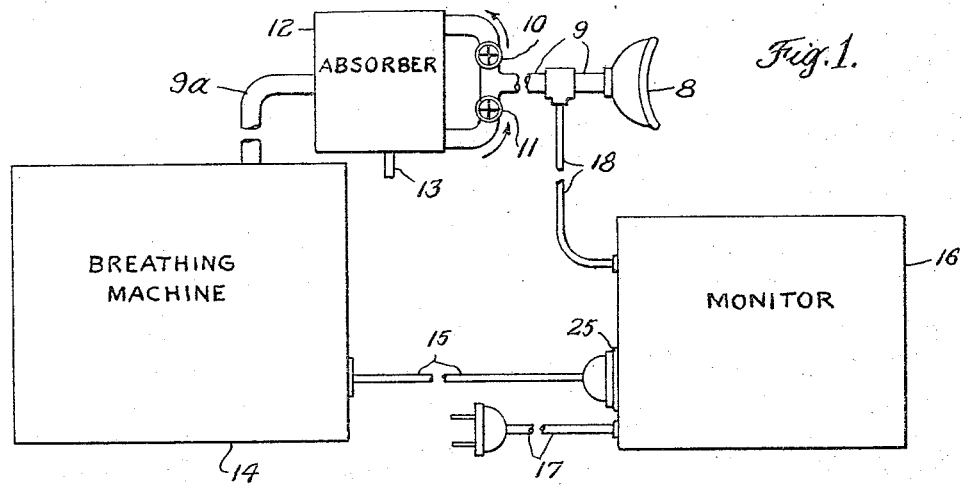
FIGURE 1 is a diagrammatic block diagram representing the general manner of association of a monitor according to the present invention with breathing apparatus including not only a breathing machine but also anesthesia equipment.

Referring first to FIGURE 1, there is indicated at 8 a mouthpiece adapted to be associated with the patient. The mouthpiece may of course be replaced by a trachael fitting if desired. In either event, the mouthpiece or the trachael fitting communicates with the patient's airway 9 which has an expiration valve 10 and an inspiration valve 11 communicating with an absorber 12 constituting a part of an apparatus for administration of anesthesia. A connection 13 is shown for supply of an anesthesia gas and/or oxygen to this part of the system. An extension 9a of the patient's airway interconnects the anesthesia apparatus and the breathing machine indicated at 14. The breathing machine is normally supplied with a power cord as shown at 15 for connecting the breathing machine with the common 120 volt, 60 cycle power supply line.

The general arrangement of a breathing machine in association with anesthesia apparatus, as described just above, is well known and the monitor of the present invention is adapted to be used either with a system of that well known type or with a breathing machine which is connected directly to the patients' mask or trachael fitting.

As illustrated in FIGURE 1, the monitor of the present invention is indicated at 16 and is provided with a power supply cord 17 adapted for connection with the common 120 volt, 60 cycle power supply line. The monitor is also provided with a power output connection with which the power cord 15 of the breathing machine may be associated. In accordance with the invention, moreover, the monitor is adapted to be connected to some point in the patient's airway between the breathing machine and the patient himself, advantageously at a point close to the patient, as is indicated by the pressure connection 18 shown in FIGURE 1.

Figure 2:
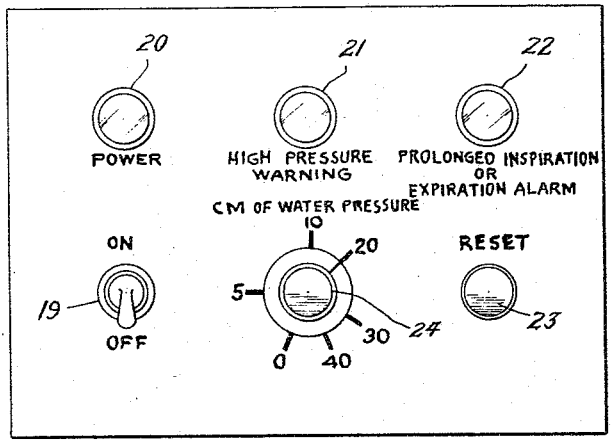
FIGURE 2 is a top view of a breathing monitor according to the invention, this view primarily illustrating the main panel and controls of the instrument.
Figure 3:
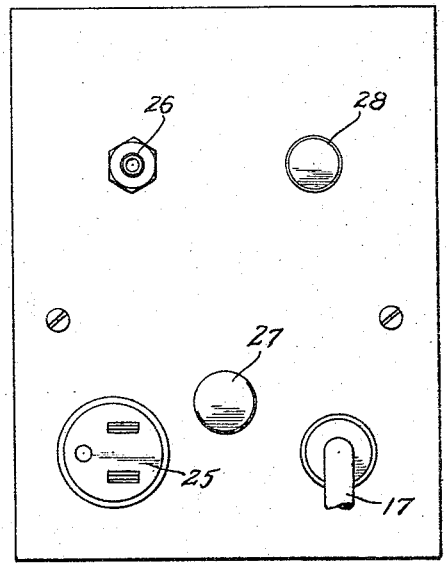
FIGURE 3 is an end elevational view of a monitor according to the invention, illustrating certain power and pressure connection points, and certain other features to be described.

For the purpose of briefly explaining the several functions performed by the monitor, reference is made to FIGURES 2 and 3. In these figures it will be seen that on the main panel of the monitor as shown in FIGURE 2 the monitor is provided with power shut-off switch 19 and also with three signal lights 20, 21 and 22. The first of these lights 20 is desirably of white color, and is turned on with the power switch provided power is present. The third of these signal lights (22) is desirably of red color and is energized either upon pressure dropping below or exceeding a predetermined value for predetermined intervals. A reset button 23 is provided for the signal light 22.

In considering the purpose and operation of the signal light 21 which is desirably of orange or yellow color, it is noted that the control panel is also provided with an adjustable dial 24 having a marking line which may be set to any of the cooperating indicia positions running from "0" to "40." These numerical values represent pressures corresponding to the indicated number of centimeters of water. Upon adjustment of the knob 24, for instance to the position shown in FIGURE 2 where the knob marking is in registry with the "20" position of the scale, in the event that the pressure in the patient's breathing circuit or airway exceeds 20 centimeters of water, the signal light 21 is immediately activated.

The end view of FIGURE 3 illustrates the power cord 17 for the monitor and also the outlet 25 which is provided for supplying power through the cord 15 to a breathing machine such as shown at 14 in FIGURE 1. FIGURE 3 further shows a connecting nipple 26 adapted to be associated with the pressure line 18 (see FIGURE 1) in order to bring the pressure of the patient's breathing circuit into the monitor and thereby effect the various signal functions of the monitor unit.

A fuse plug 27 for the power supply and also a power supply alarm test button 28 are also provided as indicated in FIGURE 3, the arrangement and operation of this test button being fully described hereinafter.

Figure 6:
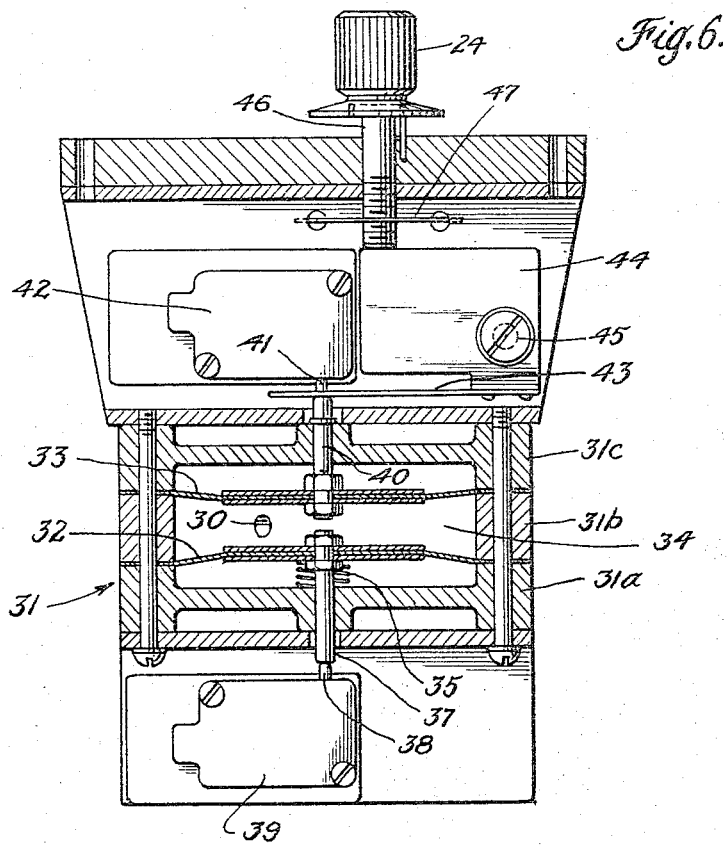
FIGURE 6 is a vertical sectional view taken substantially as indicated by the section line 6—6 on FIGURE 5.

Turning now to FIGURES 4, 5 and 6, it will be seen that the pressure connection 26 communicates through a pipe 29 and the port 30 (see FIGURE 6) with a fluid pressure responsive control device generally indicated at 31, this device being located within the monitor unit and being of construction as shown in FIGURE 6, incorporating two flexible diaphragms 32 and 33. The peripheries of these two diaphragms are clamped between the parts 31a, 31b and 31c of the unit 31, the diaphragms being spaced apart by means of the part 31b. The two diaphragms and the part 31b cooperate to define a pressure chamber 34 which is maintained at a pressure substantially conforming with that in the patient's airway through port 30, nipple 26 and the pressure connection 18.

The diaphragm 32 is biased by means of a helical compression spring 35 which urges the diaphragm upwardly, so that in the absence of pressure in the chamber 34 the diaphragm will occupy its upper position. When the pressure in the chamber 34 exceeds a certain predetermined value which is dependent upon the strength of the spring 35, the diaphragm is moved to the lower position. The diaphragm 32 is connected with the stem 37 which extends downwardly to engage the actuating element 38 of a microswitch 39 located below the unit 31. The diaphragm 33 is similarly provided with a stem 40 adapted to cooperate with the actuating element 41 of the microswitch 42, a biasing spring 43 being interposed between the parts 40 and 41. The spring 43 is of the leaf type with its base end connected to the member 44 which is oscillatable on the pivot mounting 45. It will thus be seen that the pressure of the spring 43 tending to urge the diaphragm 33 downwardly will depend upon the position of the member 44 about the pivot mounting 45. The downward pressure of the spring 43 may be adjusted by means of the knob 24 which is mounted on the threaded stem 46 projecting downwardly to abut the upper side of the member 44. The threaded stem 46 cooperates with an aperture in a spring member 47, which serves as a threaded socket or "nut" with which the threads of the stem 46 cooperate during adjustment of the knob 24.

By the arrangement described the adjustment of the knob will vary the pressure of the spring 43 tending to urge the diaphragm 33 downwardly, and in this way the microswitch 42 will be actuated at different values of pressure within the chamber 34, depending upon the adjustment of the knob 24.

Figure 7:
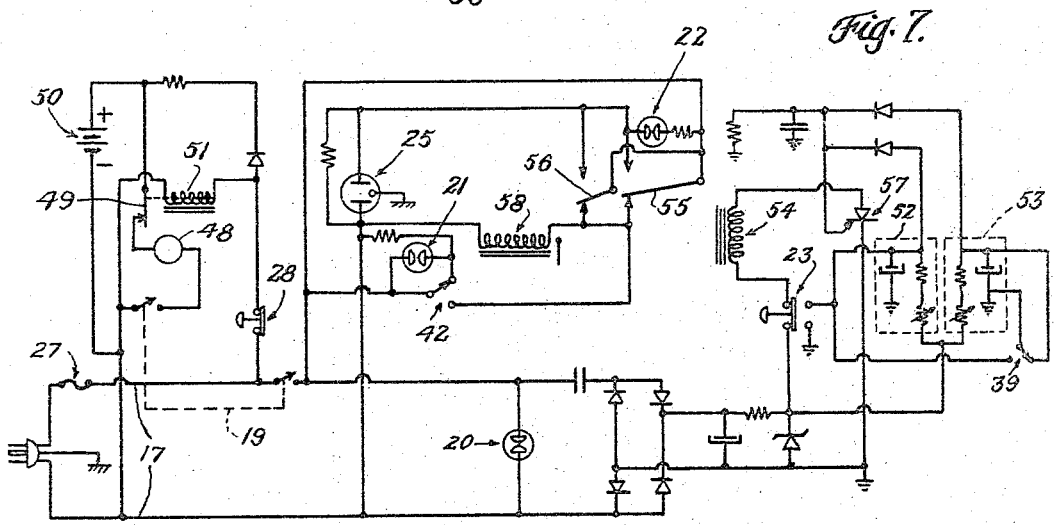
FIGURE 7 is a wiring diagram of the monitor illustrated.

The frame and case of the monitor unit provides an appropriate mounting not only for the fluid pressure control device 31 and the signal lights and other controls mentioned, but also for various internal parts including circuit components some of which are shown structurally in FIGURES 4 and 5, and all of which are indicated diagrammatically in the circuit diagram of FIGURE 7.

From FIGURE 7 it will be seen that the microswitch 39 comprises a single pole doublethrow switch, as does also the microswitch 42, and these switches perform certain functions, as will be explained in connection with the circuit diagram. From FIGURE 7 it will also be noted that the on-off switch 19, the three signal lights 20, 21 and 22, the reset button 23, the power socket 25, the fuse 27, and the power test button 28 are all indicated by the same reference characters as in the other figures. The switches 39 and 42 as shown in FIGURE 7 correspond to the positions which these switches would occupy with the diaphragms 32 and 33 in the positions shown in FIGURE 6.

Additional components shown in the circuit diagram include the following: buzzer 48, buzzer switch and buzzer operating battery 49 and 50, and solenoid 51. The components 48, 49, 50 and 51 are connected in a circuit which provides for operation of the buzzer 48 in the event of failure of the power in the supply line 17. When the power is present the solenoid 51 retains the switch 49 open and thus breaks the circuit from the battery to the buzzer; but when the power fails, solenoid 51 releases the switch 49 which thereupon closes and operates the buzzer. The battery is connected with the power line to be charged therefrom. A power signal test may be performed by operation of the test button 28, which breaks the power supply connection to the solenoid 51. It will be understood that the test button 28 is spring biased to the position shown in FIGURE 7.

Turning now to the functioning of the switch 39, it is first noted that the circuit in FIGURE 7 includes two timer mechanisms respectively enclosed within the dotted outlines 52 and 53, the timer mechanisms incorporating capacitors and resistors appropriate to the intervals desired to be timed. These timer mechanisms are supplied with rectified current from the power supply rectifier shown toward the bottom of FIGURE 7. A relay 54 preferably incorporating two double throw switches 55 and 56 is adapted to be triggered by the timers 52 and 53 through the controlled recifier indicated at 57. The switch 39 is connected in circuits associated with the timers 52 and 53 in such manner as to discharge or reset the timing mechanisms upon throw of the switch in one direction or the other. When the switch is alternately thrown to one position or the other within the timing period of the timers 52 and 53, neither of the timers will trip the relay 54. Having in mind that the switch 39 is controlled by the pressure in the chamber 34 and thus by the pressure in the patient's airway, it will therefore be seen that with appropriate time intervals established by the timers 52 and 53, with normal breathing the relay 54 will remain in one position. However, and by way of example, if the pressure in the chamber 34 remains below a predetermined value for the period of time corresponding to the timing interval of the mechanism 52 (say 11 seconds) the switch 39 because of its connection with the stem 37 of the diaphragm 32 will occupy the position shown in FIGURE 7 for an interval extending beyond the timing period of the mechanism 52, and this will result in a triggering or actuation of the relay 54, thereby drawing the switches 55 and 56 downwardly to the position shown in FIGURE 7. Each of switches 55 and 56 is connected in series with a buzzer 58 and with the power supply line 17 (assuming, of course, that the shut-off switch 19 is closed). Therefore, as a result of maintenance of a pressure below a predetermined value in the chamber 34 for an interval of time exceeding 11 seconds, the buzzer 58 is actuated. In addition the signal light 22 is arranged to be activated by this same actuation of the relay 54. In this way both an audible and a visual signal are given in the event of maintenance of a pressure below a predetermined value for a period of time exceeding a predetermined interval (in this typical example an interval of 11 seconds).

In the event of the actuation of the relay in the manner just described above under the influence of the action of the timer 52, the timer may be reset by actuation of the reset button 23 which will act to discharge the timer 52, and also temporarily open the power circuit to the relay 54. It will be understood that the reset button 23 is spring biased to the position shown in FIGURE 7.

In a manner similar to that described above, in the event of maintenance of pressure in the chamber 34 above a predetermined value for a predetermined interval (which, for example, may be 4 seconds) the switch 39 will occupy the position opposite to that shown in FIGURE 7, leaving the timing mechanism 53 in condition to trip or fire the relay 54 after a predetermined interval, and this will similarly operate both the buzzer 58 and the signal light 22.

The arrangement of the parts as shown in FIGURE 6, including the bias spring 35 and the construction of the microswitch 39, the weight of the diaphragm 32 and of the stem 37 are all preferably such as to provide a changeover point for the switch 39 at a pressure value of the order of 5 centimeters of water. With such a value, the normal breathing of the patient either as assisted by the breathing machine or as established by the breathing machine in the case of an apneic patient, will cause the diaphragm 32 to move upwardly and downwardly with each breathing cycle and thus cause the switch 39 to move back and forth between its two positions at a rate such as to prevent actuation of the relay 54. In this condition the switches 55 and 56 both remain in their upper positions and attention is now called to the fact that the power supply outlet 25 which is provided for the breathing apparatus itself (note cord 15 in FIGURE 1 plugged into the outlet 25 in the monitor) receives current from the power line 17 only when the switches 55 and 56 are in their upper positions. In view of this, it will be seen that when the timer mechanisms 52 and 53 trip the relay 54, this not only provides the audible and visual signals but in addition cuts off the power supply to the breathing machine itself, and this is a safety feature, as it is undesirable for a breathing machine to continue in operation under conditions in which the pressure in the patient's airway remains either above or below a certain predetermined value for excessive periods of time. The switches 55 and 56 thus not only serve to control various of the signal devices but also serve as shut-off switches for the power supply to the breathing machine.

The reset button 23 is so arranged in the circuits that it is employed to reset the timer 52 which actuates the relay 54 in the event of maintenance of a low pressure for a predetermined period of time, but it is to be noted that the reset button will not operate to reset the timing mechanism 53 which functions to trip the relay 54 when the pressure in the patient's airway remains above a predetermined value for an extended period of time. This is of importance in avoiding careless or unintentional termination of the alarm signal in the event the patient is being subjected to an excess of pressure.

Attention is now directed to the functioning of the microswitch 42 in the circuit of FIGURE 7, this switch being operated by the diaphragm 33 and being capable of being biased to different pressure values by adjustment of the control knob 24. The switch 42 is associated in a circuit with the signal lamp 21 and also with the buzzer 58, the circuit providing for activating the signal lamp 21 and also the buzzer 58, immediately upon an increase in pressure in the chamber 34 above the value of the setting of the control knob 24. At any pressure below the setting established by the knob 24 the switch occupies the position indicated in FIGURE 7 in which the signal lamp 21 and the buzzer 58 are both inactivated. When the switch 42 moves to the opposite position, current is supplied from the power line to both the lamp 21 and the buzzer 58.

It may be observed that the switches 55 and 56 are arranged in parallel, and they are so provided as a safety feature, insuring operation of the entire system in the event of failure of either one of those switches.

The pilot light 20 is preferably associated with the power supply line 17 beyond the shut-off switch 19, to thereby provide a visual signal of the presence of power in the unit when the switch 19 is turned on.

Although the various control and signal devices may be incorporated in or combined with a breathing machine, it is of advantage to arrange these devices in a separate or self-contained unit as is herein illustrated. The disclosed arrangement may thus readily be used with any of a variety of breathing machines.

In accordance with the foregoing a monitor unit is provided which is highly versatile and which also affords distinctive and very important safety features adapted to increase the effectiveness and safety of use of breathing apparatus as employed either with or without anesthesia.

It will be understood that the pressure connection 18 may be connected directly with the breathing machine or with some part thereof having pressure fluctuations corresponding with those in the patient's airway. Most advantageously the pressure line 18 is associated with the equipment closely adjacent to the patient, as in this way the monitor affords maximum sensitivity with respect to the actual conditions within the patient's lungs and will quickly respond with appropriate signals or warnings in the event of adverse pressure conditions developing in the patient's lungs or air passage.

We claim:

1. A monitor for use with an electrically operated breathing machine having a patient's airway comprising an electrical power supply connection for the breathing machine, a shut-off switch for the power supply connection, timing mechanism for opening the shut-off switch after the passage of a predetermined time interval, means for resetting the timing mechanism and thereby provide against opening of the shut-off switch, and a fluid pressure control device including a chamber adapted to be connected with the patient's airway and thus to be subjected to pressure fluctuations in accordance with pressure fluctuations in said airway, the control device including means responsive to said pressure fluctuations for actuating the resetting means.

2. A monitor according to claim 1 and further including a signal and means for actuating the signal concurrently with opening of the shut-off switch for the power supply connected for the breathing machine.

References Cited

UNITED STATES PATENTS

| 2,473,922 | 6/1949 | Tobias | 340—213 |
| 2,553,968 | 5/1951 | Hallerberg | 340—213 |
| 2,596,152 | 5/1952 | Johnson | 340—213 |
| 2,828,741 | 4/1958 | Delest | 128—142 |
| 2,834,953 | 5/1958 | Bechberger et al. | 340—236 |
| 3,019,423 | 1/1962 | Glover et al. | 340—279 |
| 3,106,205 | 10/1963 | Caldwell | 129—29 X |
| 3,120,843 | 2/1964 | Hyman | 128—29 X |

FOREIGN PATENTS 926,024    5/1963    Great Britain.

RICHARD A. GAUDET, *Primary Examiner.*

ROBERT E. MORGAN, *Examiner.*

K. L. HOWELL, *Assistant Examiner.*